(12) United States Patent
Kurokawa et al.

(10) Patent No.: US 6,425,455 B1
(45) Date of Patent: Jul. 30, 2002

(54) ELECTRIC POWER STEERING APPARATUS

(75) Inventors: Takanori Kurokawa, Kashiwara; Hirokazu Arai, Yamatokooriyama, both of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/657,412

(22) Filed: Sep. 8, 2000

(30) Foreign Application Priority Data

Sep. 8, 1999 (JP) .............................................. 11-254892

(51) Int. Cl.[7] .................................................. B62D 5/04
(52) U.S. Cl. ............................ 180/444; 74/446; 74/458
(58) Field of Search ............................. 180/443, 444; 74/10, 425, 461, 458, 446

(56) References Cited

U.S. PATENT DOCUMENTS

| | | | | |
|---|---|---|---|---|
| 3,461,738 A | * | 8/1969 | Pandjiris et al. .............. | 74/446 |
| 3,651,708 A | * | 3/1972 | Muller ......................... | 74/447 |
| 4,077,274 A | * | 3/1978 | Johnson ....................... | 74/446 |
| 4,589,860 A | * | 5/1986 | Brandenstein et al. ........ | 74/434 |
| 5,445,238 A | * | 8/1995 | Chikuma et al. .......... | 180/79.1 |
| 6,053,060 A | * | 4/2000 | Tumberlinson et al. ....... | 74/446 |

FOREIGN PATENT DOCUMENTS

| | | | | |
|---|---|---|---|---|
| DE | 2136175 | * | 8/1972 | .................. 74/425 |
| DE | 2450782 | * | 5/1976 | .................. 74/446 |
| FR | 667453 | * | 10/1929 | .................. 74/446 |
| FR | 1002244 | * | 3/1952 | .................. 74/446 |
| JP | A2556890 | | 8/1997 | |
| SU | 402477 | * | 1/1974 | .................. 74/425 |
| SU | 636442 | * | 12/1978 | .................. 74/425 |
| SU | 1719754 | * | 3/1992 | .................. 74/446 |

* cited by examiner

Primary Examiner—Daniel G. DePumpo

(57) ABSTRACT

An electric power steering apparatus includes a worm wheel having an annular tooth portion made of synthetic resin and a boss portion made of metal. The annular tooth portion has teeth that engage with a worm, and the boss portion is fitted to the annular tooth portion. One of an inside peripheral surface of the annular tooth portion and an outside peripheral surface of the boss portion has concaves disposed on both axial ends thereof, and the other has convexes fitted into the concaves. The radial length of these concaves and convexes is 1 to 2.5 times as large as the axial length of the concaves and convexes.

5 Claims, 6 Drawing Sheets

ELECTRIC POWER STEERING APPARATUS

BACKGROUND OF THE INVENTION

The present invention relates to an electric power steering apparatus using a motor as a source of generating a steering assisting force.

Steering of an automobile is carried out by transmitting a rotational operation of a steering wheel, which is disposed in the inside of a car chamber, to a steering mechanism disposed on the outside of the car chamber for orienting the car wheels for steering (typically, front wheels).

FIG. 1 is a cross section view illustrating a construction of a conventional electric power steering apparatus. The electric power steering apparatus includes a first steering shaft 2 connected to a steering wheel 1, a torque sensor 5 that senses a steering torque by a relative shift amount, in the rotation direction, of the first steering shaft 2 to a second steering shaft 4 connected to the first steering shaft 2 via a torsion bar 3, and a speed reduction mechanism 9 having a worm 7 and a worm wheel 8 for reducing the speed of the output of a motor 6 for steering assistance, which is driven on the basis of the result of sensing by the torque sensor 5, and for transmitting the output to the second steering shaft 4. The electric power steering apparatus is constructed to assist the operation of the steering mechanism in accordance with the rotation of the steering wheel 1 with the rotation of the motor 6 so as to reduce the labor burden imposed on the driver for steering. The worm 7 is integrally formed at an axial middle part of a worm shaft 10 linked to an output shaft of the motor 6 and disposed to cross a shaft core of the second steering shaft 4.

FIG. 2 is an enlarged cross section view of a worm wheel in a conventional electric power steering apparatus disclosed in Japanese Utility Model Publication No. 2556890. The worm wheel 8 includes an annular tooth portion 81 made of synthetic resin and a boss portion 82 made of metal. The annular tooth portion 81 has teeth that engage with the worm 7, and the boss portion 82 is fitted to the inside peripheral surface of the annular tooth portion 81, so as to reduce the noise caused by engaging with the worm 7 and to improve the processability of the teeth. Further, the outside peripheral surface of the boss portion 82 has a concave 83 disposed at one axial end thereof, and the inside peripheral surface of the annular tooth portion 81 has a convex 84 disposed at one axial end thereof. The convex 84 is fitted into the concave 83.

Meanwhile, when the motor 6 assists steering, the worm wheel 8 rotates in the right direction or in the left direction and, since the worm wheel 8 has a tooth line twisted in the rotation direction relative to the rotation center line, a component of the torque transmitted from the worm 7 acts on the worm wheel 8 in the axial direction. Since the conventional worm wheel 8 is constructed in such a manner that the outside peripheral surface of the boss portion 82 has the concave 83 disposed merely at one axial end thereof and the inside peripheral surface of the annular tooth portion 81 has the convex 84 disposed merely at one axial end thereof to be fitted into the concave 83, a further enhancement of the fatigue strength of the fit portion is desired. Further, although the worm wheel 8 having the annular tooth portion 81 made of synthetic resin can have satisfactory heat-resistance, abrasion-resistance, and dimension-stability by selection of a synthetic resin material, a further enhancement of the strength of the dedendum, or tooth base, of the annular tooth portion 81 is desired.

In other words, since the annular tooth portion 81 of the worm wheel 8 is thermally deteriorated by frictional heat due to engaging with the worm 7 to decrease the strength of the dedendum and absorbs moisture in the ambient atmosphere to decrease the strength of the dedendum, resistance to such decrease in the strength of the dedendum caused by thermal deterioration and moisture absorption is demanded.

BRIEF SUMMARY OF THE INVENTION

A principal object of the present invention is to provide an electric power steering apparatus that can further enhance the fatigue strength of the fit portion and the strength of the dedendum of the annular tooth portion.

Thus, the electric power steering apparatus according to the present invention is an electric power steering apparatus for steering assistance in which an output of a motor for steering assistance is transmitted to a steering shaft via a worm and a worm wheel, the worm wheel including an annular tooth portion made of synthetic resin and a boss portion made of metal, the annular tooth portion having teeth that engage with the worm, the boss portion being fitted to the inside peripheral surface of the annular tooth portion, wherein one of the inside peripheral surface of the annular tooth portion and the outside peripheral surface of the boss portion has concaves disposed on both axial ends thereof, and the other has convexes fitted into these concaves, and wherein the radial length (i.e. the length as viewed in the radial direction) of the concaves and the convexes is 1 to 2.5 times as large as the axial length (i.e. the length as viewed in the axial direction) of the concaves and the convexes.

If the radial length of the concaves and the convexes is less than 1 or more than 2.5 times as large as the axial length of the concaves and the convexes, the fatigue strength of the fit portion and the strength of the dedendum of the annular tooth portion are not enhanced so much. By setting the radial length of the concaves and the convexes to be 1 to 2.5 times as large as the axial length of the concaves and the convexes, the fatigue strength of the fit portion and the strength of the dedendum of the annular tooth portion can be further enhanced. Therefore, even if the annular tooth portion is thermally deteriorated to decrease the strength of the dedendum or absorbs moisture in the ambient atmosphere to decrease the strength of the dedendum, a strength of more than a predetermined degree can be ensured.

The above and further objects and features of the invention will more fully be apparent from the following detailed description with accompanying drawings.

DETAILED DESCRIPTION OF THE INVENTION

Hereafter, the present invention will be described in detail with reference to the accompanying drawings which illustrate preferred embodiments thereof.

Figure 1:
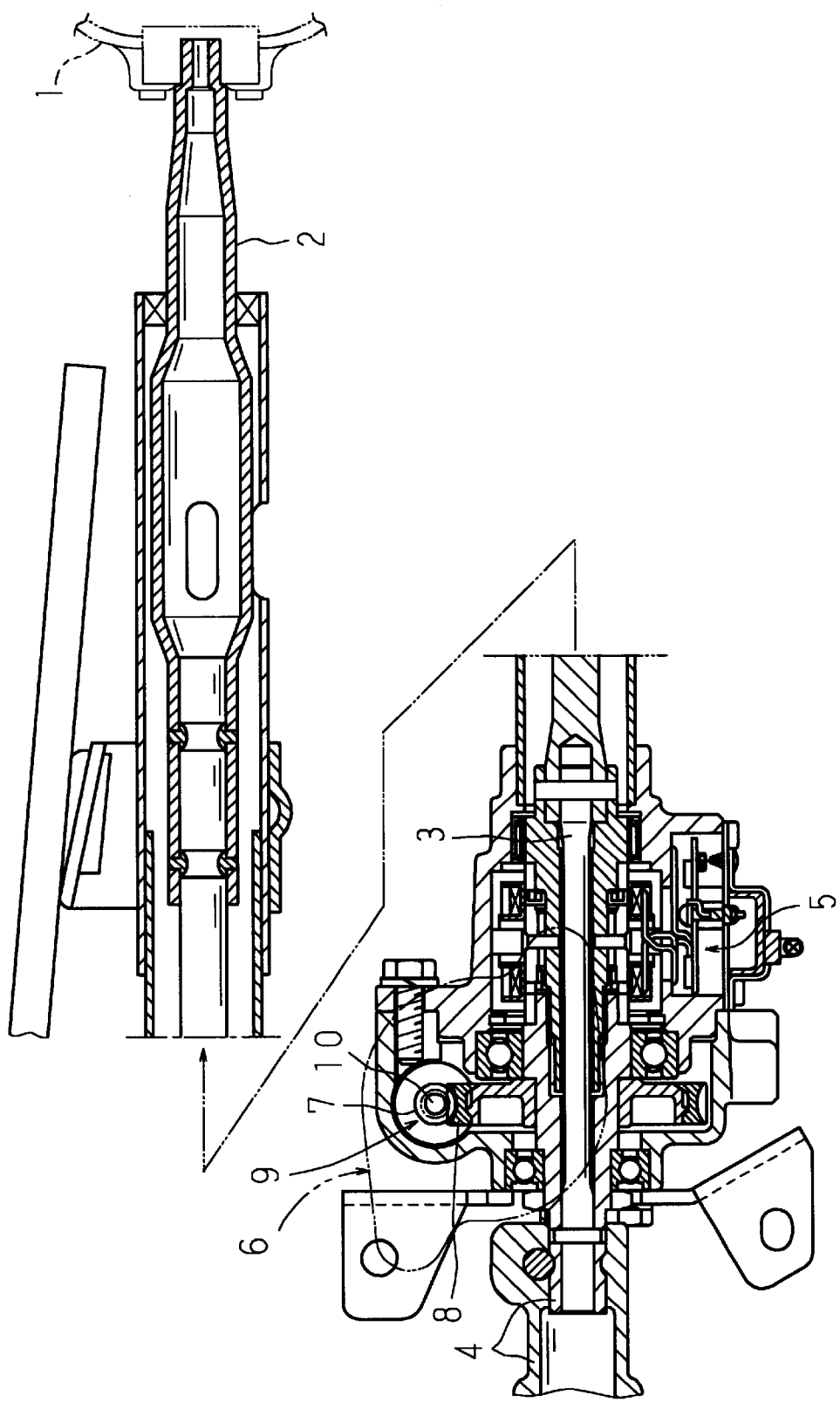
FIG. 1 is a cross section view of a conventional electric power steering apparatus.
Figure 2:
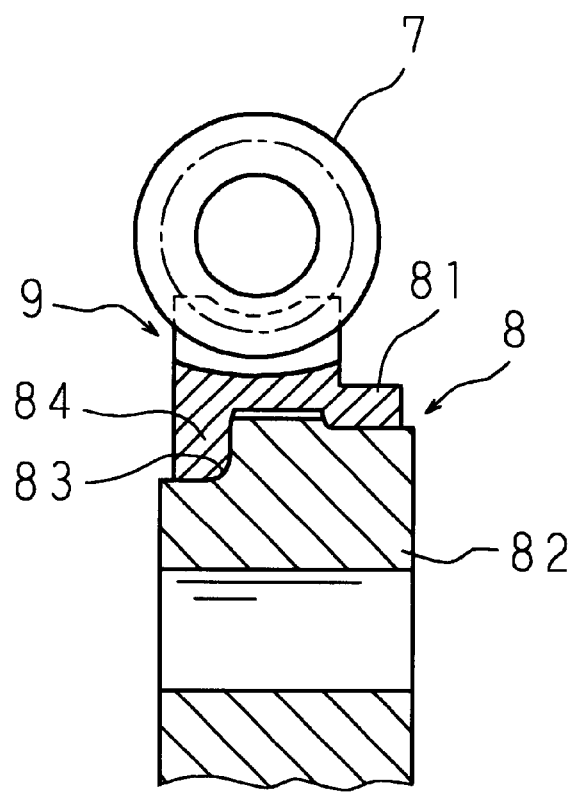
FIG. 2 is an enlarged cross section view of a worm wheel in the conventional electric power steering apparatus.
Figure 3:
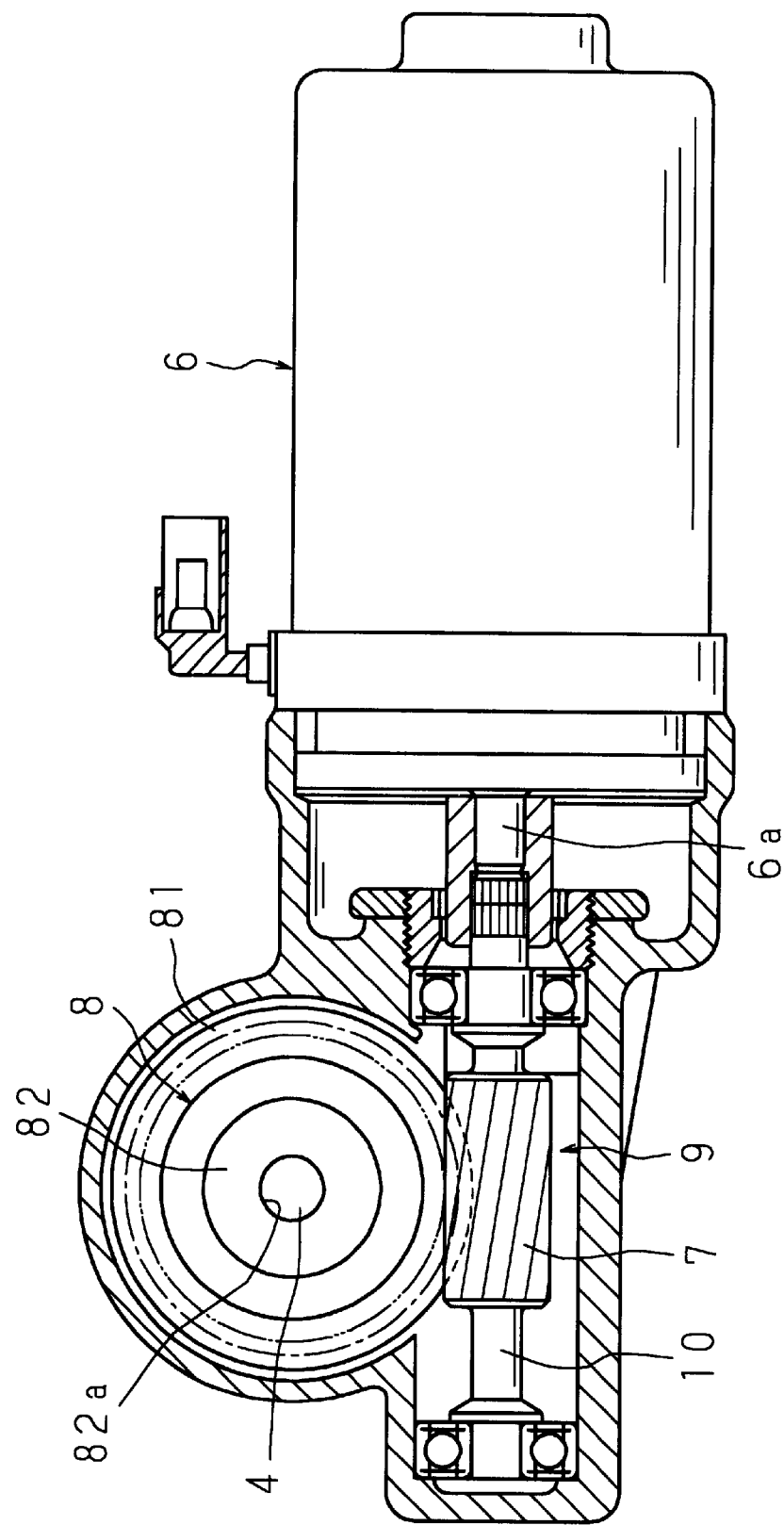
FIG. 3 is a cross section view illustrating a construction of a speed reduction mechanism and a motor portion in an electric power steering apparatus according to the present invention.
Figure 4:
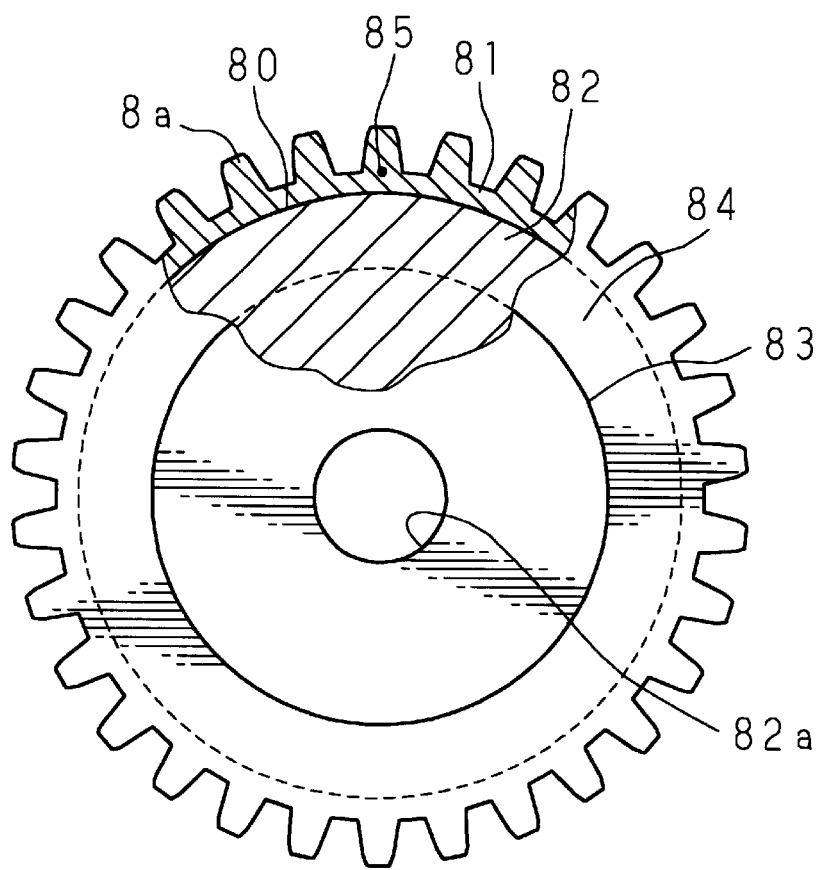
FIG. 4 is an enlarged cross section view of a worm wheel in the electric power steering apparatus according to the present invention.

FIG. 3 is a cross section view illustrating a construction of a speed reduction mechanism and a motor portion in an electric power steering apparatus according to the present invention, and FIG. 4 is an enlarged cross section view of a worm wheel 8.

As in a conventional power steering apparatus, a speed reduction mechanism 9 of the present invention includes a worm 7 and a worm wheel 8; the worm 7 is integrally formed at an axial middle part of a worm shaft 10 linked to an output shaft 6a of a motor 6 for steering assistance and disposed to cross a shaft core of a second steering shaft 4; and the worm wheel 8 engages with the worm 7 and is fitted and fixed to a middle part of the second steering shaft 4.

The worm wheel 8 includes an annular tooth portion 81 made of synthetic resin and a boss portion 82 made of metal. The annular tooth portion 81 has a plurality of teeth 8a that engage with the worm 7, and the boss portion 82 is fitted within the annular tooth portion 81 by injection molding. A through-bore 82a drilled at the central part of the boss portion 82 is fitted to the second steering shaft 4. The annular tooth portion 81 is made, for example, of nylon resin.

(First Embodiment)

Figure 5:
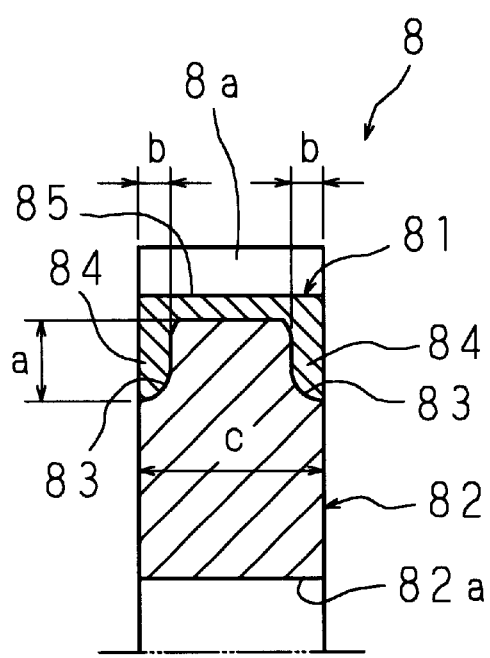
FIG. 5 is an enlarged cross section view of a worm wheel in an electric power steering apparatus according to the first embodiment of the present invention.

FIG. 5 is a partial enlarged cross section view of a worm wheel 8 according to the first embodiment of the present invention. The fit portion of the boss portion 82 into the annular tooth portion 81 is constructed in such a manner that annular concaves 83, 83 are disposed at both axial ends of the boss portion 82; annular convexes 84, 84 are disposed at both axial ends of the annular tooth portion 81 to be fitted into the concaves 83, 83; and the radial length (a) of the concaves 83, 83 and the convexes 84, 84 is set to be 1 to 2.5 times as large as the axial length (b) of the concaves 83, 83 and the convexes 84, 84. Further, the axial length (c) of the annular tooth portion 81 and the boss portion 82 is set to be 4.5 to 5.5 times as large as the length (b).

By thus setting the length (a) to be 1 to 2.5 times as large as the length (b), the fatigue strength of the fit portion 80 and the strength of the dedendum 85 can be increased as compared with the case in which the length (a) is less than 1 or more than 2.5 times as large as the length (b).

Therefore, even if the annular tooth portion 81 is thermally deteriorated by frictional heat due to engaging with the worm 7 to decrease the strength of the dedendum 85 or absorbs moisture in the ambient atmosphere to decrease the strength of the dedendum 85, a fatigue strength of more than a predetermined degree can be ensured.

Further, since the strength of the dedendum 85 can be enhanced, as described above, by setting the length (a) to be 1 to 2.5 times as large as the length (b), the thickness from the tooth bottom of the annular tooth portion 81 to the inside surface excluding the convexes 84, 84 can be made smaller as compared with the case in which the annular tooth portion 81 does not have the convexes 84, 84. Therefore, the amount of use of synthetic resin materials, which are more expensive than metal materials, can be reduced, and the period of time required for injection molding of one unit can be shortened, thereby reducing the costs.

(Second Embodiment)

Figure 6:
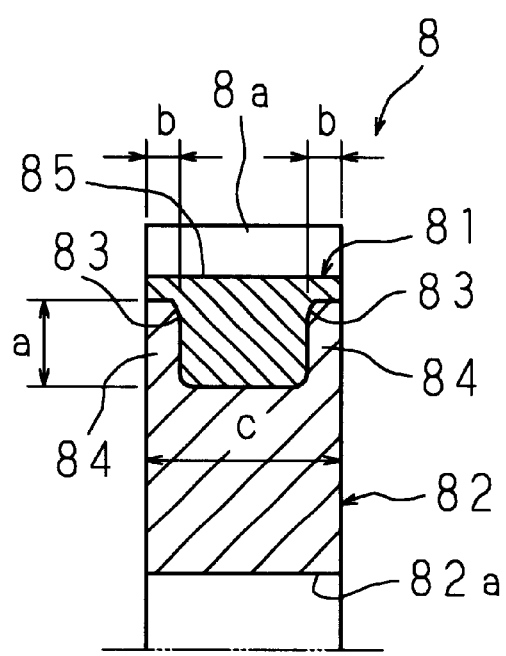
FIG. 6 is an enlarged cross section view of a worm wheel in an electric power steering apparatus according to the second embodiment of the present invention.

FIG. 6 is a partial enlarged cross section view of a worm wheel 8 according to the second embodiment of the present invention. In the first embodiment described above, the concaves 83, 83 are disposed at both axial ends on the outside peripheral surface of the boss portion 82, and the convexes 84, 84 are disposed at both axial ends on the inside peripheral surface of the annular tooth portion 81. In contrast, in the second embodiment, as shown for example in FIG. 6, annular concaves 83, 83 are disposed at both axial ends on the inside peripheral surface of the annular tooth portion 81, and annular convexes 84, 84 are disposed at both axial ends on the outside peripheral surface of the boss portion 82.

The relationship among the radial length (a) of the concaves 83, 83 and the convexes 84, 84, the axial length (b) of the concaves 83, 83 and the convexes 84, 84, and the axial length (c) of the annular tooth portion 81 and the boss portion 82 in the second embodiment is the same as in the first embodiment, so that the fatigue strength of the fit portion 80 and the strength of the dedendum 85 can be increased, thereby taking the same effect as in the first embodiment.

Here, the above description has been given on the case in which the concaves 83 and the convexes 84 are annular; however, the concaves 83 and the convexes 84 may have a circular arc shape which is discontinuous at one or more positions in the circumferential direction.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus, comprising:
    a motor for steering assistance;
    a worm to which an output of said motor is transmitted;
    a worm wheel including an annular tooth portion made of synthetic resin and a boss portion made of metal, said annular tooth portion having teeth that engage with said worm, said boss portion being fitted to an inside peripheral surface of said annular tooth portion;
    a steering shaft to which the output of said motor is transmitted via said worm and said worm wheel;
    concaves disposed on both axial ends of an outside peripheral surface of said boss portion; and
    convexes disposed on both axial ends of the inside peripheral surface of said annular tooth portion, said convexes being fitted into said concaves,
    wherein a radial length of said concaves and said convexes is 1 to 2.5 times as large as an axial length of said concaves and said convexes.

2. The electric power steering apparatus according to claim 1, wherein an axial length of said annular tooth portion and said boss portion is 4.5 to 5.5 times as large as the axial length of said concaves and said convexes.

3. The electric power steering apparatus according to claim 1, wherein said concaves and said convexes are annular.

4. The electric power steering apparatus according to claim 1, wherein said annular tooth portion is made of nylon resin.

5. The electrical power steering apparatus according to claim 1, wherein the annular tooth portion is fastened to the boss portion solely by bonding.

* * * * *